R. STOCK.
DUST GUARD FOR WHEELS.
APPLICATION FILED AUG. 30, 1910.
1,048,369.
Patented Dec. 24, 1912.
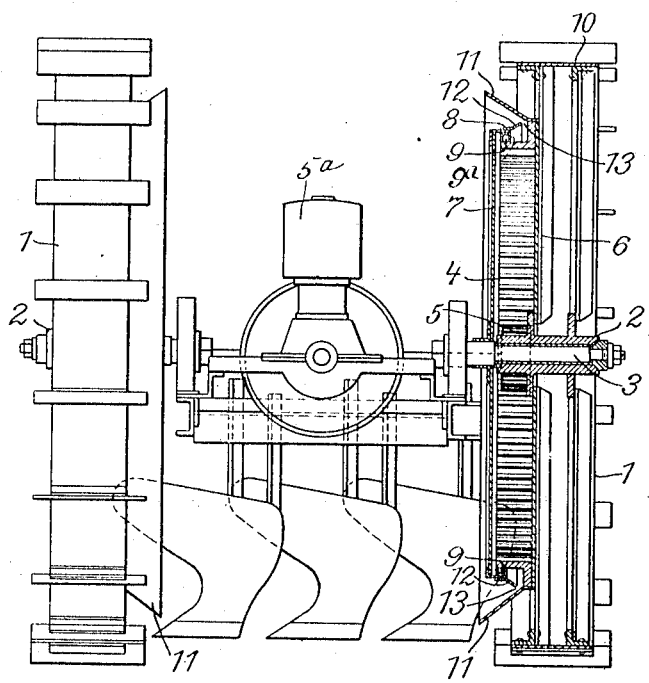
Witnesses:
Inventor
Robert Stock
by John Lotka
Attorney

UNITED STATES PATENT OFFICE.

ROBERT STOCK, OF BERLIN, GERMANY.

DUST-GUARD FOR WHEELS.

1,048,369.  Specification of Letters Patent.  Patented Dec. 24, 1912.

Application filed August 30, 1910. Serial No. 579,723.

*To all whom it may concern:*

Be it known that I, ROBERT STOCK, a subject of the German Emperor, and a resident of Berlin, Germany, have invented certain new and useful Improvements in Dust-Guards for Wheels, of which the following is a specification.

My invention relates to toothed wheels of motor plows or other vehicles, and has for its object to provide efficient protection against the entrance of dust, mud, lumps of soil, stones, and other foreign matter liable to injure the gear teeth. Lateral cover plates such as used hitherto, have proved inadequate for this purpose.

According to my present invention, deflectors of a novel construction and arrangement are used in conjunction with the gearing.

I will now proceed to describe one form of my invention with reference to the accompanying drawing, which is partly an end elevation and partly a cross-section of a motor plow fitted with my improved guard.

The drive wheels 1 are provided with hubs 2 mounted to turn on the axles 3. Each drive wheel is mounted independently, and has an internally toothed ring 4 in engagement with a driving pinion 5 operated from a suitable motor 5ª. On the outside of the ring 4 is located a rotary cover plate 6 secured to the wheel 1, while on the inside I arrange a stationary cover plate 7 secured to the axle 3, which plates, to a considerable extent, prevent the entrance of dust and other foreign matter between the teeth of the rings 4 and of the pinions 5. The inner plate 7 is provided with an outwardly projected flange 8 perpendicular to the plane of said plate, and to this flange is secured a packing ring 9 of felt or the like (preferably within a holder 9ª of U-shaped cross-section) which engages the outer periphery of the ring 4 and thus better protects the gearing on the inside.

The arrangement so far described in detail has been found insufficient to shield the gearing as perfectly as is desirable in practice. According to my present invention, an annular deflector 11 has been provided on the inner side of the wheel 1, between the axle 3 and the rim 10, preferably secured at the outer periphery of the toothed ring 4 and of the cover plate 6, the outer edge of said plate being spaced from the rim 10 so that openings are left between the rim and said plate, as shown in the drawing at the right. This rotary deflector is interposed between the rim 10 and the joint of the plate 7 (and its packing ring 9) with the ring 4, so that any stones, lumps of soil, etc. carried up by the rim 10 and then dropping from it cannot reach said joint. As shown the deflector 11 is conical, flaring toward the inside.

If a vertical line be drawn through the inner edge of the rim 10 in the drawing (which line would indicate the plane in which said edge is contained), the deflector 11 will be seen, obviously, to lie partly to one side (the inside, or left) and partly to the other side (the outside, or right) of such line or plane, thus making it clear that any matter dropping from the inner edge of the rim 10 must fall on the deflector, to then slide outward (to the right) and escape between the spokes of the wheel.

It will be understood that in speaking of left and right I am referring exclusively to the wheel shown in section in the drawing, that is to say, the right-hand wheel.

Any stones or other articles dropping from the rim 10 on the conical surface of the deflector 11 will slide down outwardly, that is to say, toward the free end of the axle 3, passing out through the openings left between the rim 10 and the periphery of the cover plate 6.

Within the deflector 11 is located an opposing stationary deflector 12, at an angle to the deflector 11; preferably the deflector 12 is secured to the flange 8 and flares outward conically. The free outer edge of the deflector 12 is arranged close to the inner surface of the deflector 11, leaving only a small gap 13 through which lumps of soil cannot pass.

Any dust passing through the gap 13 and settling on the outer surface of the ring 4 will fall off said surface at the bottom of the wheel, thus dropping on the inclined inner surface of the deflector 11 and sliding to the ground, as will be readily understood by looking at the right-hand portion of the drawing. The entrance of dust between the teeth of the gearing 4, 5 is thus prevented efficiently.

It will be evident that various modifications may be made without departing from the nature of my invention as set forth in the claims, and I therefore do not wish to restrict myself to the specific construction shown in the drawing.

I claim as my invention:

1. A wheel provided with a rim and with gearing located between the said rim and the center of the wheel, a stationary cover for said gearing, an annular deflector secured to said cover and increasing in diameter from the cover to the free edge of the deflector, said deflector surrounding a portion of said gearing, and another annular deflector, held to rotate with the wheel and located between the wheel rim and the stationary deflector, said rotary deflector flaring from a point adjacent to the free edge of the stationary deflector, in a direction opposite to the flare of the said stationary deflector.

2. A wheel provided with a rim and with gearing located between the said rim and the center of the wheel, a stationary cover for said gearing, an annular deflector secured to said cover and increasing in diameter from the cover to the free edge of the deflector, said deflector surrounding a portion of said gearing, a rotary cover plate for said gearing, the outer edge of said rotary plate being spaced from the rim so as to form openings for the escape of stones and other foreign matter, and another annular deflector, held to rotate with the wheel and located between the wheel rim and the stationary deflector, said rotary deflector flaring from a point adjacent to the free edge of the stationary deflector, in a direction opposite to the flare of said stationary deflector, so as to guide any matter falling from the rim on the outer surface of the rotary deflector, to the openings intervening between the rim and the outer edge of the rotary cover plate.

In testimony whereof, I have signed this specification in the presence of two subscribing witnesses.

ROBERT STOCK.

Witnesses:
HENRY HASPER,
ARTHUR SCHROEDER.

---

Copies of this patent may be obtained for five cents each, by addressing the "Commissioner of Patents, Washington, D. C."